United States Patent [19]

Williams

[11] 3,830,076

[45] Aug. 20, 1974

[54] DISPENSING PROCESS
[75] Inventor: David C. Williams, Royal Oak, Mich.
[73] Assignee: Parke, David & Company, Detroit, Mich.
[22] Filed: June 21, 1973
[21] Appl. No.: 372,045

[52] U.S. Cl............................ 62/60, 62/62, 62/320, 209/3, 241/3, 241/23, 128/1 R
[51] Int. Cl............................................. B65b 63/08
[58] Field of Search............ 241/3, 18, 23; 62/1, 60, 62/62, 320, 371, 372, 531; 209/3, 10

[56] References Cited
UNITED STATES PATENTS

| 2,583,697 | 1/1952 | Hendry, Jr. et al................. | 62/64 X |
| 3,596,842 | 8/1971 | Barber................................ | 209/3 X |
| 3,643,873 | 2/1972 | George............................... | 241/23 X |

*Primary Examiner*—Meyer Perlin
*Assistant Examiner*—Ronald C. Capossela

[57] ABSTRACT

A method is provided for dispensing an aqueous product packaged in frozen condition in a plastic container or envelope which comprises holding the frozen packaged product at substantially lower temperatures (e.g., at "cryogenic" temperatures) at which the package material is brittle or structurally weak for a time sufficient to weaken the container, breaking the weakened container to expose the frozen contents and isolating the latter.

7 Claims, No Drawings

DISPENSING PROCESS

SUMMARY AND DETAILED DESCRIPTION:

This invention relates to a method of dispensing frozen aqueous products. In particular, the invention relates to dispensing the frozen contents of a packaged aqueous product by cooling the package to temperatures at which the package material is brittle or structurally weak, and breaking and separating the package material from the frozen contents.

The problem of dispensing many types of frozen products such as biological products in packaged form prior to the present invention has been difficult and has often involved contamination, spoilage, etc., particularly as to heat-labile products. The usual procedure for dispensing frozen biological products, blood products and the like, for example, has been to remove the contents from the package before thawing. This has involved allowing the package to thaw sufficiently on the surface to enable the package envelope to be cut or sawed free and separated from the frozen content. This work is ordinarily done by hand and there is corresponding risk of injury during the cutting operation. The operation, however, is untidy and unduly time-consuming. Also, the melted portion of the contents which results from thawing must usually be discarded if contaminated by the operation or if heat-damaged. In the case of blood products containing antihemophilic factor (AHF), for example, AHF titer is quickly lost at room temperature so that thawing of the frozen product for extended periods should be avoided.

It is therefore an object of the present invention to provide a method of dispensing frozen packaged products which minimizes contamination, spoilage, heat damage and the like.

It is another object of the invention to provide a method of opening packages of frozen products which avoids cutting or sawing of the package.

It is also an object of the invention to provide an economical method of dispensing the contents of frozen packaged products.

It is still another object of the invention to provide a simple method of dispensing frozen packaged products which avoids thawing prior to opening of the package.

These and other objects, purposes and advantages of the invention will be seen in reference to the following description.

According to the present invention, the method of dispensing an aqueous product packaged at storage temperature as a frozen mass in a plastic container, which plastic is durable at storage temperature but structurally weak at substantially lower temperatures, comprises the steps of holding the frozen packaged product at said lower temperatures for a time sufficient to cause the container to become weak, breaking the weakened container to expose the frozen contents, and isolating the contents.

The invention is applicable to aqueous products broadly and particularly aqueous food products, biological products, and the like which ordinarily are stored in frozen condition. Specific examples of biological products are blood products, blood fractions, donor blood, albumin, globulins, etc. Blood products in particular which possess antihemophilic factor or other heat-labile component can be readily handled by the present method without loss of titer. As to food products, the invention permits rapid dispensing so that the item can be quickly processed further, as by electronic cooking, without risk of flavor loss during conventional thawing and dispensing.

To carry out the method of the invention, the frozen packaged product, conveniently in a batch of individual items, is introduced into a cooling zone and held there for a time sufficient to weaken the structure of the container in which the product is packaged. The invention is applicable to food or pharmaceutical grade package containers made of a plastic material which is durable at storage temperature but which becomes brittle in short periods at substantially lower temperatures. Such containers are in conventional form as bags, boxes, etc., fabricated in any suitable way from plastic film, sheet or the like such as ethylene vinyl acetate copolymer, high density polyethylene film, polyethylene sheet (e.g., 15 mil.), polystyrene, polypropylene, polyvinyl chloride and the like.

In the holding step, the preferred lower temperatures for weakening the container are cryogenic temperatures, that is, temperatures below the boiling point of oxygen. For this purpose, the holding temperature is conveniently maintained by using liquid nitrogen as the cooling agent and immersing the packaged frozen product in the liquid contained in an open refrigerator vat for a short period usually from 4 to 15 seconds. The temperature below the liquid level is about −320° F. and above the liquid level in the vat reaches a maximum of about −220° F. Other cooling agents and temperature ranges and exposure times can be used such that the plastic becomes structurally weak within reasonable periods.

Following completion of the holding step, according to the invention the package is removed and the weakened plastic container is shattered, stripped, broken into fragments or otherwise handled to expose the frozen contents for isolation.

The frozen aqueous product as a single mass is then processed further as by milling or chopping while in the frozen state or by thawing under sterile or aseptic conditions such that the quality of heat-labile components is maintained. It is found that the method, surprisingly, does not adversely affect the quality of the frozen contents and is economical. The method provides a completely clean separation of container and contents and does not involve cutting, sawing or other hazardous procedure.

While the invention in method for dispensing frozen packaged products has been described in considerable detail, it will be realized that wide variation in such detail can be made by those skilled in the art without departing from the spirit of the invention as hereinafter claimed.

I claim:

1. The method of dispensing aqueous products packaged at storage temperature as a frozen mass in a plastic container which plastic is durable at storage temperature but structurally weak at substantially lower temperatures, which comprises the steps of holding the frozen packaged product at said lower temperatures for a time sufficient to cause the container to become weak, breaking the weakened container to expose the frozen contents, and isolating the contents.

2. The method of dispensing according to claim 1 which includes thawing the isolated contents.

3. The method of dispensing according to claim 1 where the holding temperature is about −320° F.

4. The method of dispensing according to claim 1 where the product is a blood product.

5. The method of dispensing according to claim 1 where the product is a blood product containing a heat-labile blood component.

6. The method of dispensing according to claim 1 where the holding step is carried out by immersing the packaged product in liquid nitrogen.

7. The method of dispensing according to claim 6 where the immersion is carried out for at least 4 seconds.

* * * * *